(12) United States Patent
Morimitsu et al.

(10) Patent No.: US 8,304,517 B2
(45) Date of Patent: Nov. 6, 2012

(54) METHOD FOR PRODUCING GRANULATED CARBOXYL GROUP-CONTAINING POLYMER PARTICLE AND GRANULATED CARBOXYL GROUP-CONTAINING POLYMER PARTICLE

(75) Inventors: Yuichiro Morimitsu, Hyogo (JP);
Masatoyo Yoshinaka, Tokyo (JP);
Shinji Kobayashi, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 316 days.

(21) Appl. No.: 12/663,650

(22) PCT Filed: Jun. 9, 2008

(86) PCT No.: PCT/JP2008/060534
§ 371 (c)(1),
(2), (4) Date: Feb. 8, 2010

(87) PCT Pub. No.: WO2008/156003
PCT Pub. Date: Dec. 24, 2008

(65) Prior Publication Data
US 2010/0159245 A1    Jun. 24, 2010

(30) Foreign Application Priority Data

Jun. 19, 2007 (JP) .................................. 2007-160831

(51) Int. Cl.
*C08F 6/00* (2006.01)
*C08G 64/00* (2006.01)
(52) U.S. Cl. ..................... 528/502 R; 428/402; 526/318
(58) Field of Classification Search .............. 528/502 R; 428/402; 526/318
See application file for complete search history.

(56) References Cited

U.S. PATENT DOCUMENTS

| | | | |
|---|---|---|---|
| 2,923,629 A | 2/1960 | Bonomi | |
| 2,958,679 A | 11/1960 | Jones | |
| 4,996,274 A | 2/1991 | Hsu | |
| 5,004,598 A | 4/1991 | Lochhead et al. | |
| 5,342,911 A | 8/1994 | Bresciani | |
| 5,663,253 A | 9/1997 | Russo et al. | |
| 7,732,528 B2 * | 6/2010 | Steinmetz et al. | 525/78 |
| 7,842,779 B2 * | 11/2010 | Morimitsu et al. | 528/502 R |
| 2010/0196763 A1 * | 8/2010 | Morimitsu et al. | 429/303 |

FOREIGN PATENT DOCUMENTS

| | | |
|---|---|---|
| JP | 51-6190 | 1/1976 |
| JP | 52-2877 | 1/1977 |
| JP | 52-136262 | 11/1977 |
| JP | 58-84819 | 5/1983 |
| JP | 60-12361 | 4/1985 |
| JP | 3-143605 | 6/1991 |
| JP | 5-39966 | 6/1993 |
| WO | 03/016382 | 2/2003 |

* cited by examiner

*Primary Examiner* — Terressa Boykin
(74) *Attorney, Agent, or Firm* — Hamre, Schumann, Mueller & Larson, P.C.

(57) ABSTRACT

An object of the present invention is to provide a method for easily producing granular carboxyl group-containing polymer particles that have a high bulk density and readily swell in water. The present invention provides a method for producing granular carboxyl group-containing polymer particles, which includes: producing carboxyl group-containing polymer particles; preparing an aggregate of the carboxyl group-containing polymer particles by allowing the carboxyl group-containing polymer particles to absorb an polar organic solvent to a liquid content of 5 to 25% by mass; and drying the aggregate of the carboxyl group-containing polymer particles and then grinding the dried aggregate.

4 Claims, No Drawings

METHOD FOR PRODUCING GRANULATED CARBOXYL GROUP-CONTAINING POLYMER PARTICLE AND GRANULATED CARBOXYL GROUP-CONTAINING POLYMER PARTICLE

TECHNICAL FIELD

The present invention relates to a method for producing granular carboxyl group-containing polymer particles and granular carboxyl group-containing polymer particles obtained by the method. More specifically, the present invention relates to a method for producing granular carboxyl group-containing polymer particles which are suitably useable as thickening agents for cosmetics and the like, and granular carboxyl group-containing polymer particles obtained by the method.

BACKGROUND ART

Crosslinked carboxyl group-containing polymers, alkyl-modified carboxyl group-containing polymers, and the like are known examples of carboxyl group-containing polymers to be used as thickening agents for cosmetics or the like, as humectants for cataplasms, and as suspension stabilizers for emulsions, suspensions or the like. Known examples of the crosslinked carboxyl group-containing polymers include copolymers of an $\alpha,\beta$-unsaturated carboxylic acid, such as acrylic acid, and a polyallyl ether (cf. Patent Document 1), copolymers of an $\alpha,\beta$-unsaturated carboxylic acid and hexaallyl trimethylene trisulfone (cf. Patent Document 2), copolymers of an $\alpha,\beta$-unsaturated carboxylic acid and glycidyl methacrylate or the like (cf. Patent Document 3), copolymers of an $\alpha,\beta$-unsaturated carboxylic acid and pentaerythritol allyl ether (cf. Patent Document 4, Patent Document 5, and Patent Document 6), and copolymers of an $\alpha,\beta$-unsaturated carboxylic acid, a (meth)acrylic acid ester, and pentaerythritol allyl ether (cf. Patent Document 7 and Patent Document 8).

Known examples of the alkyl-modified carboxyl group-containing polymers include copolymers of a polyacrylic acid or (meth)acrylic acid and a (meth)acrylic acid alkyl ester, among others. More specifically, the known examples include copolymers obtained by reacting a specific amount of an olefinically unsaturated carboxylic acid monomer with a specific amount of a (meth)acrylic acid alkyl ester (the alkyl group containing 10 to 30 carbon atoms) (cf. Patent Document 9) and copolymers obtained by reacting an olefinically unsaturated carboxylic acid monomer with a (meth)acrylic acid alkyl ester (the alkyl group containing 8 to 30 carbon atoms) (cf. Patent Document 10).

In using the carboxyl group-containing polymer particle including crosslinked carboxyl group-containing polymers, alkyl-modified carboxyl group-containing polymers or the like in the aforementioned fields of application, it is first necessary to prepare a uniform aqueous dispersion of the carboxyl group-containing polymer particles and then neutralize the dispersion with an alkali to give a neutralized viscous liquid with a concentration of about 0.1 to 1% by mass. However, the aforementioned carboxyl group-containing polymer particles have a drawback that, as they are generally in the form of a fine powder, undissolved lumps are readily formed upon dispersing the particles in water. Once the undissolved lumps have been formed, a gel-like layer is formed on the surface of each lump and therefore the rate of permeation of water into the inside thereof is reduced. As a result, it becomes difficult to obtain a uniform aqueous dispersion.

For the aforementioned reasons, in preparing an aqueous dispersion of carboxyl group-containing polymer particles, it is necessary to include an unproductive procedure of gradually adding powders of the carboxyl group-containing polymer particles to water under high-speed stirring for preventing the formation of undissolved lumps. Moreover, in some cases, a special dissolution apparatus may be required for preventing the formation of undissolved lumps.

Furthermore, as the carboxyl group-containing polymer particles mentioned earlier are in the form of a fine powder and are readily charged electrically, the polymer particles cause heavy dusting. Therefore, the carboxyl group-containing polymer particles mentioned earlier have disadvantages that they are not only difficult to handle but are not suitable for the working environment as well. Furthermore, the carboxyl group-containing polymer particles in fine powder form problematically have low bulk density and therefore cause an increase in transportation cost and require an increased number of storage sites.

For the reasons mentioned earlier, the advent of a granular carboxyl group-containing polymer particle has been awaited.

In granulating a powder, a granulator is generally used. The granulators are broadly classified into three types, that is, mixing granulation, forced granulation and granulation utilizing heat depending on methods of granulation to choose.

Examples of the granulators for mixing granulation include a fluidized bed granulator and a tumbling granulator. Those granulators produce granules by allowing powders to float and flow by means of an air stream or stirring blade or by tumbling while uniformly spraying the powders with a liquid serving as a binder. When an attempt is made to apply these granulators for mixing granulation to the carboxyl group-containing polymer particles, since the carboxyl group-containing polymer particles are very small in particle size and low in bulk density, it is difficult to allow those particles to float and flow by means of an air stream or stirring blade or by tumbling. The liquid serving as a binder is preferably water or a polar organic solvent. However, when the floating and flowing carboxyl group-containing polymer particles are sprayed with water or the polar organic solvent, the carboxyl group-containing polymer particles get sticky and adhere to inside walls of the granulator or a binder-spraying nozzle, or stick to one another to form large undissolved lumps.

Examples of the granulators for forced granulation include a compression molding granulator and an extrusion granulator. As the method for granulating the carboxyl group-containing polymer particles utilizing forced granulation, a method including compressing fine powders using a compression molding machine, followed by grinding (cf. Patent Document 11) may be exemplified. However, this method has a problem that, for example, the carboxyl group-containing polymer particles are excessively compressed by the pressure exerted by the compression molding machine, and as a result, the swelling property of the resulting granular carboxyl group-containing polymer particles in water is deteriorated.

Examples of the granulator for granulation utilizing heat include a spray dryer. A spray dryer, however, has problems, for example, that it is economically disadvantaged due to the need for dilution of the carboxyl group-containing polymer particles with water, an organic solvent or the like to a viscosity level at which the diluted product can be sprayed, and that the granule to be obtained is not porous and thus poor in solubility in water.

On the other hand, examples of known methods for granulation without using the granulators mentioned earlier are the method including bringing fine powders of a polymer flocculant into contact with water vapor for granulation (cf. Patent Document 12), the method including dispersing fine powders of a water-soluble polymer in an organic solvent and then adding water for granulation (cf. Patent Document 13), and the method including feeding a lubricant and water simultaneously and continuously to a water-soluble polymeric substance in fine powder form and grinding the thus-granulated gel bodies (cf. Patent Document 14). In the case of the carboxyl group-containing polymer particles, however, it is difficult to apply those methods because of problems such as the problem (1): the carboxyl group-containing polymer particles, when brought into contact with water formed due to dew condensation of water vapor, swell with the water, and thus the finally-obtained granule is not porous and has poor solubility in water, and additionally the problem that, in the method including allowing powders to fall to contact with water vapor, it is difficult to allow the carboxyl group-containing polymer particles to uniformly fall due to the poor flowability thereof and a large amount of dust may possibly be flung up upon allowing the powder to fall; the problem (2): on the occasion of adding water following dispersing the particles in an organic solvent, the resulting hydrous gel forms undissolved lumps; and the problem (3): since the granule contains an unnecessary lubricant depending on use and is produced via a gel form, the granule obtained is not porous and has poor solubility in water.

Patent Document 1: U.S. Pat. No. 2,923,629
Patent Document 2: U.S. Pat. No. 2,958,679
Patent Document 3: Japanese Kokai Publication Sho-58-84819 (JP-A 58-84819)
Patent Document 4: U.S. Pat. No. 5,342,911
Patent Document 5: U.S. Pat. No. 5,663,253
Patent Document 6: U.S. Pat. No. 4,996,274
Patent Document 7: Japanese Kokoku Publication Hei-05-39966 (JP-B 05-39966)
Patent Document 8: Japanese Kokoku Publication Sho-60-12361 (JP-B 60-12361)
Patent Document 9: Japanese Kokai Publication Sho-51-6190 (JP-A 51-6190)
Patent Document 10: U.S. Pat. No. 5,004,598
Patent Document 11: WO 03/016382
Patent Document 12: Japanese Kokai Publication Sho-52-2877 (JP-A 52-2877)
Patent Document 13: Japanese Kokai Publication Sho-52-136262 (JP-A 52-136262)
Patent Document 14: Japanese Kokai Publication Hei-03-143605 (JP-A 03-143605)

DISCLOSURE OF INVENTION

Problems to be Solved by the Invention

The present invention aims to provide a method for easily producing granular carboxyl group-containing polymer particles which have a high bulk density and readily swell in water.

Means for Solving the Problems

The present invention has been completed based on the finding that granular carboxyl group-containing polymer particles can be obtained by allowing carboxyl group-containing polymer particles to absorb a polar organic solvent to a specific level of liquid content to give an aggregate, subsequently drying and grinding the aggregate. Namely, the present invention relates to the following Items.

Item 1: A method for producing granular carboxyl group-containing polymer particles, including:
producing carboxyl group-containing polymer particles;
preparing an aggregate of the carboxyl group-containing polymer particles by allowing the carboxyl group-containing polymer particles to absorb a polar organic solvent to a liquid content of 5 to 25% by mass; and
drying the aggregate of the carboxyl group-containing polymer particles and then grinding the dried aggregate.

Item 2: The method for producing granular carboxyl group-containing polymer particles according to Item 1,
wherein, in producing the carboxyl group-containing polymer particles, an $\alpha,\beta$-unsaturated carboxylic acid-type compound and a compound containing two or more ethylenically unsaturated groups are polymerized in an inert solvent in the presence of a radical polymerization initiator to give crosslinked carboxyl group-containing polymer particles.

Item 3: The method for producing granular carboxyl group-containing polymer particles according to Item 1,
wherein, in producing the carboxyl group-containing polymer particles, an $\alpha,\beta$-unsaturated carboxylic acid-type compound and a (meth)acrylic acid alkyl ester containing an alkyl group of 10 to 30 carbon atoms are polymerized in an inert solvent in the presence of a radical polymerization initiator to give alkyl-modified carboxyl group-containing polymer particles.

Item 4: The method for producing granular carboxyl group-containing polymer particles according to any one of Items 1 to 3,
wherein, in preparing the aggregate of the carboxyl group-containing polymer particles, the polar organic solvent is at least one member selected from the group consisting of alcohols containing 1 to 5 carbon atoms, ketones containing 3 to 6 carbon atoms, esters containing 3 to 6 carbon atoms, and ethers containing 4 to 6 carbon atoms.

Item 5: Granular carboxyl group-containing polymer particles obtained by the production method according to any one of Items 1 to 4, the granular carboxyl group-containing polymer particles having the following characteristics 1) to 3):
1) a median particle size of 300 to 800 μm;
2) a bulk density of not lower than 0.30 g/ml; and
3) a time of not longer than 30 minutes to be required for all the granular carboxyl group-containing polymer particles to swell when placed in standing water at 25° C. in a proportion of 0.5% by mass relative to the water.

Effects of the Invention

According to the production method of the present invention, it is possible to produce granular carboxyl group-containing polymer particles which hardly form undissolved lumps, have an excellent swelling property in water, hardly cause dusting and are thus superior in handleability as compared with carboxyl group-containing polymer particles in fine powder form. By dissolving the granular carboxyl group-containing polymer particles obtained by the production method of the present invention in water and then neutralizing the solution with an alkali such as sodium hydroxide and triethanolamine, it is possible to obtain a neutralized viscous liquid having excellent surface smoothness, thickening property, and transparency in a short period of time.

BEST MODE FOR CARRYING OUT THE INVENTION

The method for producing granular carboxyl group-containing polymer particles of the present invention includes producing carboxyl group-containing polymer particles. Preferably used as the carboxyl group-containing polymer particles are crosslinked carboxyl group-containing polymer particles or alkyl-modified carboxyl group-containing polymer particles.

The crosslinked carboxyl group-containing polymer particles to be used in the present invention can be produced by polymerizing an α,β-unsaturated carboxylic acid-type compound and a compound containing two or more ethylenically unsaturated groups in an inert solvent in the presence of a radical polymerization initiator.

The α,β-unsaturated carboxylic acid-type compound to be used in producing the crosslinked carboxyl group-containing polymer particle mentioned earlier is not particularly limited, and examples thereof include an α,β-unsaturated carboxylic acid such as acrylic acid, methacrylic acid, crotonic acid, maleic acid, itaconic acid, fumaric acid; and an α,β-unsaturated carboxylic acid alkyl ester such as methyl acrylate, ethyl acrylate, octyl acrylate, lauryl acrylate, myristyl acrylate, behenyl acrylate, lauryl methacrylate, myristyl methacrylate, behenyl methacrylate. These may be used singly or two or more of them may be used in combination.

In the present invention, acrylic acid and methacrylic acid are collectively referred to as (meth)acrylic acid.

In producing the aforementioned crosslinked carboxyl group-containing polymer particle, the α,β-unsaturated carboxylic acid-type compound is used preferably in an amount of 6 to 25 parts by volume, more preferably 8 to 22 parts by volume, particularly preferably 13 to 20 parts by volume, relative to 100 parts by volume of the inert solvent to be specifically described later herein. When the amount used of the α,β-unsaturated carboxylic acid-type compound is smaller than 6 parts by volume, the neutralized viscous liquid prepared from the granular carboxyl group-containing polymer particles obtained may become poor in transparency. When the amount used of the α,β-unsaturated carboxylic acid-type compound is in excess of 25 parts by volume, the crosslinked carboxyl group-containing polymer particles will precipitate out with the progress of the reaction, possibly making it difficult to perform uniform stirring and, in addition, the neutralized viscous liquid prepared from the granular carboxyl group-containing polymer particles obtained may have poor surface smoothness.

In the present invention, the term "neutralized" in the phrase "neutralized viscous liquid" means that the liquid or solution has a pH of 6.5 to 7.5.

The aforementioned compound containing two or more ethylenically unsaturated groups is not particularly limited, and examples thereof include di- or more substituted-acrylic acid esters of polyols such as ethylene glycol, propylene glycol, polyoxyethylene glycol, polyoxypropylene glycol, glycerol, polyglycerol, trimethylolpropane, pentaerythritol, saccharose and sorbitol; di- or more substituted-allyl ethers of such polyols as mentioned above; diallyl phthalate, triallyl phosphate, allyl methacrylate, tetraallyloxyethane, triallyl cyanurate, divinyl adipate, vinyl crotonate, 1,5-hexadiene, and divinylbenzene. Pentaerythritol allyl ether and polyallyl saccharose are preferred among the above examples since they, even when used in a small proportion, can give a neutralized viscous liquid having a high thickening property and capable of providing emulsions, suspensions and the like with a high suspension stability.

The compound containing two or more ethylenically unsaturated groups is used preferably in an amount of 0.01 to 2 parts by mass, and more preferably 0.3 to 1.5 parts by mass, relative to 100 parts by mass of the α,β-unsaturated carboxylic acid-type compound. When the amount used of the compound containing two or more ethylenically unsaturated groups is smaller than 0.01 parts by mass, the neutralized viscous liquid prepared from the granular carboxyl group-containing polymer particles obtained may show reduced viscosity. When the amount of the compound containing two or more ethylenically unsaturated groups is in excess of 2 parts by mass, an insoluble gel may be readily formed in the neutralized viscous liquid prepared from the granular carboxyl group-containing polymer particles obtained.

The alkyl-modified carboxyl group-containing polymer particles to be used in the present invention can be produced by polymerizing an α,β-unsaturated carboxylic acid-type compound and a (meth)acrylic acid alkyl ester containing an alkyl group of 10 to 30 carbon atoms in an inert solvent in the presence of a radical polymerization initiator.

The α,β-unsaturated carboxylic acid-type compound to be used in producing the aforementioned alkyl-modified carboxyl group-containing polymer particle is not particularly limited, and examples thereof include acrylic acid, methacrylic acid, crotonic acid, maleic acid, itaconic acid and fumaric acid. These may be used singly or two or more of them may be used in combination.

In producing the alkyl-modified carboxyl group-containing polymer particle mentioned above, the α,β-unsaturated carboxylic acid-type compound is used preferably in an amount of 6 to 25 parts by volume, more preferably 8 to 22 parts by volume, and particularly preferably 13 to 20 parts by volume, relative to 100 parts by volume of the inert solvent to be specifically described later herein. When the amount used of the α,β-unsaturated carboxylic acid-type compound is smaller than 6 parts by volume, the transparency of the neutralized viscous liquid prepared from the granular carboxyl group-containing polymer particles obtained may be deteriorated. When the amount used of the α,β-unsaturated carboxylic acid-type compound is in excess of 25 parts by volume, the alkyl-modified carboxyl group-containing polymer particles will precipitate out with the progress of the reaction, possibly making it difficult to perform uniform stirring and, in addition, the neutralized viscous liquid prepared from the granular carboxyl group-containing polymer particles obtained may have poor surface smoothness.

The (meth)acrylic acid alkyl ester containing an alkyl group of 10 to 30 carbon atoms to be used in the present invention is an ester derived from (meth)acrylic acid and a higher alcohol containing an alkyl group of 10 to 30 carbon atoms. Examples of the esters include an ester derived from (meth)acrylic acid and stearyl alcohol, an ester derived from (meth)acrylic acid and eicosanol, an ester derived from (meth)acrylic acid and behenyl alcohol, and an ester derived from (meth)acrylic acid and tetracosanol. Stearyl methacrylate, eicosanyl methacrylate, behenyl methacrylate, and tetracosanyl methacrylate are preferably used among the above examples since the neutralized viscous liquid prepared from the granular carboxyl group-containing polymer particles obtained is superior in viscosity characteristics and texture regardless of the presence or absence of an electrolyte. As the (meth)acrylic acid alkyl ester containing an alkyl group of 10 to 30 carbon atoms, a commercial product such as Blemmer VMA 70 produced by NOF Corporation may also be used.

In the present invention, the (meth)acrylic acid alkyl ester containing an alkyl group of 10 to 30 carbon atoms is used preferably in an amount of 0.5 to 20 parts by mass, and more preferably 1 to 10 parts by mass, relative to 100 parts by mass of the α,β-unsaturated carboxylic acid-type compound. When the (meth)acrylic acid alkyl ester containing an alkyl group of 10 to 30 carbon atoms is used in an amount smaller than 0.5 parts by mass relative to 100 parts by mass of the α,β-unsaturated carboxylic acid-type compound, the neutralized viscous liquid prepared from the granular carboxyl group-containing polymer particles obtained may have poor transparency in the presence of an electrolyte. On the other hand, when it is used in excess of 20 parts by mass, the granular carboxyl group-containing polymer particle obtained may have poor solubility in water.

The aforementioned radical polymerization initiator is not particularly limited, and examples thereof include α,α'-azobisisobutyronitrile, 2,2'-azobis-2,4-dimethylvaleronitrile, dimethyl 2,2'-azobisisobutyrate, benzoyl peroxide, lauroyl peroxide, cumene hydroperoxide and tert-butyl hydroperoxide.

The radical polymerization initiator is used preferably in an amount of 0.01 to 0.45 parts by mass, and more preferably 0.01 to 0.35 parts by mass, relative to 100 parts by mass of the α,β-unsaturated carboxylic acid-type compound. When the radical polymerization initiator is used in an amount smaller than 0.01 parts by mass, the rate of reaction may become slow to cause an economic disadvantage. When the radical polymerization initiator is used in an amount exceeding 0.45 parts by mass, the neutralized viscous liquid prepared from the granular carboxyl group-containing polymer particles obtained may possibly have poor surface smoothness.

In the present invention, the "inert solvent" refers to a solvent which is capable of dissolving the α,β-unsaturated carboxylic acid-type compound, capable of dissolving the compound containing two or more ethylenically unsaturated groups or the (meth)acrylic acid alkyl ester containing an alkyl group of 10 to 30 carbon atoms, but is incapable of dissolving the carboxyl group-containing polymer particles obtained.

Examples of the inert solvent include normalpentane, normalhexane, normalheptane, normaloctane, isooctane, cyclopentane, methylcyclopentane, cyclohexane, methylcyclohexane, benzene, toluene, xylene, chlorobenzene, ethylene dichloride, ethyl acetate, isopropyl acetate, ethyl methyl ketone, and isobutyl methyl ketone. These may be used singly or two or more of them may be used in combination. Ethylene dichloride and normalhexane are preferred among the above examples from the viewpoints of the quality stability and ready availability.

The atmosphere in which the α,β-unsaturated carboxylic acid-type compound and the compound containing two or more ethylenically unsaturated groups are polymerized or the α,β-unsaturated carboxylic acid-type compound and the (meth)acrylic acid alkyl ester containing an alkyl group of 10 to 30 carbon atoms are polymerized is preferably an inert gas atmosphere such as nitrogen gas atmosphere and argon gas atmosphere.

The reaction temperature is preferably 50 to 90° C., and more preferably 55 to 75° C., from the viewpoint that the reaction solution is to be inhibited from increasing in viscosity and that the neutralized viscous liquid prepared from the granular carboxyl group-containing polymer particles obtained is to be improved in surface smoothness.

The reaction time cannot be absolutely specified since it depends on the reaction temperature, but it is generally 2 to 10 hours.

After completion of the reaction, the reaction solution is heated to 80 to 130° C. to thereby distill off the inert solvent, whereupon the carboxyl group-containing polymer particle can be obtained in the form of a fine white powder. When the heating temperature is lower than 80° C., a long period of time may be required for drying and, when it is higher than 130° C., the neutralized viscous liquid prepared from the granular carboxyl group-containing polymer particles obtained may have poor surface smoothness.

In the present invention, preparing an aggregate of the aforementioned carboxyl group-containing polymer particles is carried out by allowing the carboxyl group-containing polymer particles obtained in the aforementioned process to absorb a polar organic solvent to a liquid content of 5 to 25% by mass.

Examples of the polar organic solvent include alcohols containing 1 to 5 carbon atoms, ketones containing 3 to 6 carbon atoms, esters containing 3 to 6 carbon atoms, and ethers containing 4 to 6 carbon atoms.

Examples of the alcohols containing 1 to 5 carbon atoms include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 1,1-dimethyl-1-propanol, 1,2-dimethyl-1-propanol, and 2,2-dimethyl-1-propanol.

Examples of the ketones containing 3 to 6 carbon atoms include acetone, ethyl methyl ketone, methyl propyl ketone, diethyl ketone, butyl methyl ketone, and isobutyl methyl ketone.

Examples of the esters containing 3 to 6 carbon atoms include methyl acetate, ethyl acetate, propyl acetate, isopropyl acetate, butyl acetate, isobutyl acetate, methyl propionate, ethyl propionate, propyl propionate, methyl butanoate, and ethyl butanoate.

Examples of the ethers containing 4 to 6 carbon atoms include methyl propyl ether, butyl methyl ether, diethyl ether, ethyl propyl ether, butyl ethyl ether, and dipropyl ether.

These may be used singly or two or more of them may be used in combination. Methanol, ethanol, acetone, ethyl methyl ketone, and ethyl acetate are preferred among the above examples from the viewpoints of the ready availability.

On the occasion of forming the aggregate by allowing the carboxyl group-containing polymer particles to absorb a polar organic solvent, the liquid content is 5 to 25% by mass, and preferably 5 to 23% by mass. When the liquid content is lower than 5% by mass, the effect of aggregating the carboxyl group-containing polymer particles is insignificant and sufficient level of aggregation may not be obtained. On the other hand, when the liquid content of the carboxyl group-containing polymer particles is higher than 25% by mass, there are drawbacks that the aggregation is excessively promoted and therefore the grinding after drying becomes difficult, and that the time to be required for dissolving the granule when dispersing in water becomes prolonged.

In the present description, the "liquid content" refers to the percentage of the increment of the mass of the carboxyl group-containing polymer particles resulting from the absorption of the polar organic solvent to the mass of the particles before the absorption. More specifically, the percentage of the increment of the mass of the carboxyl group-containing polymer particles resulting from the absorption of the polar organic solvent to the mass of the particles before the absorption is calculated according to the following formula.

$$\text{Liquid content (\% by mass)} = (Y-X)/X \times 100$$

(In the above formula, X is the mass (g) of the carboxyl group-containing polymer particles before absorption of the polar organic solvent, and Y is the mass (g) of the carboxyl group-containing polymer particles after absorption of the polar organic solvent.)

In the present invention, the method for allowing the carboxyl group-containing polymer particles to absorb a polar organic solvent to a liquid content of 5 to 25% by mass is not particularly limited. Examples of the method include a method including spraying the carboxyl group-containing polymer particles with fine drops of the polar organic solvent, and a method including keeping the carboxyl group-containing polymer particles in vapor of the polar organic solvent. A particularly preferable example is a method including keeping the carboxyl group-containing polymer particles in vapor of the polar organic solvent at a temperature of from about 20° C. lower than the boiling point of the polar organic solvent to the boiling point. Upon keeping the carboxyl group-containing polymer particles in vapor of the polar organic solvent, when the temperature is below the temperature about 20° C. lower than the boiling point of the polar organic solvent, the time to be required for allowing the carboxyl group-containing polymer particles to aggregate may be prolonged. Moreover, upon keeping the carboxyl group-containing polymer particles in vapor of the polar organic solvent, the temperature higher than the boiling point of the polar organic solvent is not preferable as it requires a large amount of energy.

Since a boiling point of a polar organic solvent is determined depending on the surrounding pressure, the boiling point of the polar organic solvent is determined based on the pressure at which the carboxyl group-containing polymer particles are kept. Specifically, temperatures for keeping the particles may be, for example, 45 to 65° C. (under atmospheric pressure) for methanol, 59 to 79° C. (under atmospheric pressure) for ethanol, 36 to 56° C. (under atmospheric pressure) for acetone, 59 to 79° C. (under atmospheric pressure) for ethyl methyl ketone, and 57 to 77° C. (under atmospheric pressure) for ethyl acetate. In the case of using a polar organic solvent having a high boiling point under atmospheric pressure, aggregation of the carboxyl group-containing polymer particles may become easier by allowing the carboxyl group-containing polymer particles to absorb the polar organic solvent under reduced pressure.

The keeping time is not generally specified since the state of aggregation varies depending on the liquid content attained at the temperature. The keeping time is not particularly limited as long as the carboxyl group-containing polymer particles are kept for a period necessary for sufficient aggregation thereof. For example, under a condition of at about 20° C. lower than the boiling point of the polar organic solvent to be used, it is preferable that the carboxyl group-containing polymer particles are kept for about 0.5 to 4 hours so as to achieve a high liquid content of about 15 to 20% by mass. On the other hand, under such a condition as at a temperature of the boiling point of the polar organic solvent, since satisfactory aggregates can be produced even at a low liquid content of 5 to 10% by mass, the keeping time of 5 to 60 minutes may be sufficient.

The method for keeping the carboxyl group-containing polymer particles under the specific temperature conditions as mentioned above is not particularly limited. An example of the method is a method including allowing the carboxyl group-containing polymer particles to stand in a state of a layer having such a thickness capable of uniformly absorbing liquid, in a device in which: the space containing the carboxyl group-containing polymer particles is kept under a uniform vapor of the polar organic solvent; condensation of the polar organic solvent due to temperature changes does not occur; and the temperature of the space and generation of the vapor of the polar organic solvent can be precisely controlled. The term "stand" as used herein indicates that the carboxyl group-containing polymer particles are not in a flowing state. Thus, the term "stand" includes a case where the carboxyl group-containing polymer particles are moved without flowing by an apparatus such as a belt conveyor in the device.

By allowing the carboxyl group-containing polymer particles to absorb the polar organic solvent to a liquid content of 5 to 25% by mass in the aforementioned manner, the particles are bonded together, with the polar organic solvent as a binder, to form aggregates.

The method for producing granular carboxyl group-containing polymer particles of the present invention includes drying the obtained aggregates of the carboxyl group-containing polymer particles and then grinding the dried aggregates.

After drying and grinding the aggregates, the granular carboxyl group-containing polymer particles of the present invention can be obtained.

The drying apparatus to be used in the above drying is not particularly limited but may be, for example, a vacuum drier. The drying temperature is preferably 30 to 130° C., and more preferably 50 to 110° C. When the drying temperature is lower than 30° C., a prolonged drying time may be required. When the drying temperature exceeds 130° C., the solubility of the granular carboxyl group-containing polymer particle in water may be impaired. The liquid content after drying is preferably lower than 5% by mass from the viewpoint that the fluidity after grinding is to be secured and that the granular carboxyl group-containing polymer particles are not to form undissolved lumps during a long period of storage.

The grinding apparatus to be used in the above grinding is not particularly limited but may be conventionally-used grinding machines such as a pin mill type grinder, a hammer mill type grinder and a jet mill type grinder.

According to the manners as mentioned earlier, the granular carboxyl group-containing polymer particles of the present invention can be obtained. Further, by classifying the resulting granular particles using a sieve with a desired mesh size and removing coarse grains, it is also possible to allow the resulting granular particles to have a desired median particle size.

The granular carboxyl group-containing polymer particle obtained by the production method of the present invention preferably has the following characteristics 1) to 3):
1) a median particle size of 300 to 800 µm;
2) a bulk density of not lower than 0.30 g/ml; and
3) a time of not longer than 30 minutes to be required for all the granular carboxyl group-containing polymer particles to swell when placed in standing water at 25° C. in a proportion of 0.5% by mass relative to the water.

The granular carboxyl group-containing polymer particle of the present invention preferably has a median particle size of 300 to 800 µm, and more preferably 400 to 600 µm. When the median particle size is smaller than 300 µm, dust may be readily flung up at the time of use. Moreover, on the occasion of adding the granular carboxyl group-containing polymer particles to standing water at 25° C. in the proportion of, for example, 0.5% by mass relative to the water, undissolved lumps may be readily formed and the time to be required for all polymer particles to swell may sometimes exceed 30 minutes. On the other hand, when the median particle size exceeds 800 µm, although the handling thereof becomes easy, the time to be required for all polymer particles to swell in water may be a long period and sometimes exceed 30 minutes.

In the present invention, the term "median particle size" refers to the particle size corresponding to the mesh size of the sieve which is used for classifying the granular carboxyl group-containing polymer particles at the time when an accumulated mass of the granular carboxyl group-containing polymer particles obtained by adding up the mass of the particles remaining on each of sieves after classifying the particles with the sieves arrives at 50% by mass of the total mass of the particles. More specifically, seven standard sieves according to JIS-Z-8801-1982 (mesh sizes of 850 μm, 500 μm, 355 μm, 300 μm, 250 μm, 180 μm and 106 μm) and a receiving pan are prepared. Those sieves are stacked up in ascending order of mesh size from the bottom to the top. After 100 g of the granular carboxyl group-containing polymer particles are placed on the sieve having the largest mesh size, sieving is carried out by shaking the sieves using a Ro-Tap sieve shaker for 10 minutes. Thereafter, the particles remaining on the respective sieves are individually weighed, and the mass of the particles on each of the sieves is added up in descending order of the mesh size to obtain each value of an accumulated mass. The particle size corresponding to the mesh size of the sieve used when the accumulated mass reaches 50% by mass of the total mass of the particles is calculated according to the formula mentioned below, and the particle size thus obtained is determined as the median particle size.

The median particle size (μm)=(50−$A$)/($C$−$A$)×($D$−$B$)+$B$

In the above formula, A represents the accumulated value (g) obtained by sequentially adding up the mass of the granular carboxyl group-containing polymer particles remaining on the sieves in descending order of mesh size from the largest one until the accumulated mass arrives a level lower than 50% by mass but closest to 50% by mass of the total mass of the particles. C represents the accumulated value (g) obtained by sequentially adding up the mass of the particles remaining on the sieves in descending order of mesh size from the largest one until the accumulated mass arrives at a level higher than 50% by mass but closest to 50% by mass of the total mass of the particles. D is the mesh size (μm) of the sieve smallest in mesh size as involved in the calculation of the aforementioned accumulated value A, and B is the mesh size (μm) of the sieve smallest in mesh size as involved in the calculation of the aforementioned accumulated value C.

The granular carboxyl group-containing polymer particles of the present invention preferably have a bulk density of not lower than 0.30 g/ml, more preferably 0.30 to 0.60 g/ml, particularly preferably 0.35 to 0.55 g/ml. When the bulk density is lower than 0.30 g/ml, the bulk density cannot be said to be significantly higher as compared with the prior art carboxyl group-containing polymer particles and therefore such problems as the increase in transportation cost and the necessity of a large number of storage sites cannot be solved.

In the present invention, the "bulk density" refers to the value obtained by dividing the mass of the granular carboxyl group-containing polymer particles by the volume of the polymer particles having that mass. More specifically, it is the value obtained by pouring 10 g of the granular carboxyl group-containing polymer particles into an empty 50 ml measuring cylinder from a position 5 cm above that cylinder over within 20 seconds, measuring the volume (ml) of the space occupied by the granular carboxyl group-containing polymer particles and dividing the mass of 10 g of the polymer particle by the volume (ml) of the space occupied by the granular carboxyl group-containing polymer particles.

The granular carboxyl group-containing polymer particle of the present invention preferably behaves as follows. When the polymer particles are placed in standing water at 25° C. in a proportion of 0.5% by mass relative to the water and the subsequent state of swelling of the polymer particles is observed with eyes, the time to be required for all the polymer particles to swell is preferably not longer than 30 minutes, more preferably 30 minutes to 1 minute. The time to be required for all polymer particles to swell exceeding 30 minutes is not preferable since the swelling property cannot be said to be significantly better as compared with the prior art carboxyl group-containing polymer particles.

The following examples and comparative examples illustrate the present invention more specifically. These examples are, however, by no means limitative of the scope of the present invention. It is to be noted that the operations mentioned below were performed under atmospheric pressure unless otherwise stated.

Example 1

A 500 ml four-necked flask equipped with a stirrer, a thermometer, a nitrogen inlet tube, and a condenser was charged with 45 g (42.9 ml) of acrylic acid, 0.24 g of pentaerythritol allyl ether, 0.153 g of α,α'-azobisisobutyronitrile and 150 g (223.9 ml) of normalhexane, followed by uniform stirring for mixing up. Thereafter, nitrogen gas was blown into the solution for removing the oxygen present in the upper space of a reaction vessel, raw materials and a solvent. Subsequently, while the temperature was maintained at 60 to 65° C., the reaction was allowed to proceed under nitrogen atmosphere for four hours.

After completion of the reaction, the slurry formed was heated to 90° C. to distill off the normalhexane, and the residue was further dried at 110° C. under reduced pressure (10 mm Hg) for eight hours, whereupon 41 g of the crosslinked carboxyl group-containing polymer particle was obtained as a fine white powder.

The thus-obtained crosslinked carboxyl group-containing polymer particles (12 g) were thinly and uniformly spread on a stainless steel dish having a diameter of 10 cm, and then allowed to stand for 10 minutes in a separable flask in which the temperature was controlled to 54° C. in the presence of methanol vapor. The liquid content after the standing was 8% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. Subsequently, the thus-obtained granular crosslinked carboxyl group-containing polymer particles were classified using a sieve with a mesh size of 1000 μm, whereby 11.5 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The swelling time was evaluated by the method mentioned below. The results are shown in Table 1.

[Evaluation Method]

Water (150 g) is placed in a 200 ml beaker and the water temperature is adjusted to 25° C. While this is in a standing-still state, 0.75 g of the granular crosslinked carboxyl group-containing polymer particles are fed into the water, and the time to be required for all the polymer particles to swell to the core thereof is measured. The judgment about the time of arrival of the granular crosslinked carboxyl group-containing polymer particles at the state of swelling in water is made by observing with eyes whether or not the polymer particles, which are white when being dried, become translucent white as a result of swelling in water.

Example 2

Crosslinked carboxyl group-containing polymer particles (12 g) obtained in the same manner as in Example 1 were thinly and uniformly spread on a stainless steel dish having a diameter of 10 cm, and then allowed to stand for 30 minutes in a separable flask in which the temperature was controlled to 70° C. in the presence of ethanol vapor. The liquid content after the standing was 11% by mass. The resulting product was dried at 80° C. for two hours and then ground using a pin mill type grinder (trade name: Fine Impact Mill, product of Hosokawa Micron Corporation) to produce granular crosslinked carboxyl group-containing polymer particles. Subsequently, the thus-obtained granular crosslinked carboxyl group-containing polymer particles were classified using a sieve with a mesh size of 1000 μm, whereby 11.4 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Example 3

Crosslinked carboxyl group-containing polymer particles (12 g) obtained in the same manner as in Example 1 were thinly and uniformly spread on a stainless steel dish with a diameter of 10 cm, and then allowed to stand for 30 minutes in a separable flask in which the temperature was controlled to 55° C. in the presence of acetone vapor. The liquid content after the standing was 13% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.4 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Example 4

Crosslinked carboxyl group-containing polymer particles (12 g) obtained in the same manner as in Example 1 were thinly and uniformly spread on a stainless steel dish with a diameter of 10 cm, and then allowed to stand for 50 minutes in a separable flask in which the temperature was controlled to 66° C. in the presence of ethyl methyl ketone vapor. The liquid content after the standing was 20% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.5 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Example 5

Crosslinked carboxyl group-containing polymer particles (12 g) obtained in the same manner as in Example 1 were thinly and uniformly spread on a stainless steel dish with a diameter of 10 cm, and then allowed to stand for 50 minutes in a separable flask in which the temperature was controlled to 75° C. in the presence of ethyl acetate vapor. The liquid content after the standing was 21% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.6 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Comparative Example 1

Crosslinked carboxyl group-containing polymer particles (12 g) obtained in the same manner as in Example 1 were thinly and uniformly spread on a stainless steel dish with a diameter of 10 cm, and then allowed to stand for 30 minutes in a separable flask in which the temperature was controlled to 30° C. in the presence of methanol vapor. The liquid content after the standing was 3% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.5 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Comparative Example 2

Crosslinked carboxyl group-containing polymer particles (12 g) obtained in the same manner as in Example 1 were thinly and uniformly spread on a stainless steel dish with a diameter of 10 cm, and then allowed to stand for 30 minutes in a separable flask in which the temperature was controlled to 30° C. in the presence of ethanol vapor. The liquid content after the standing was 4% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.4 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Comparative Example 3

Crosslinked carboxyl group-containing polymer particles (12 g) obtained in the same manner as in Example 1 were thinly and uniformly spread on a stainless steel dish with a diameter of 10 cm, and then allowed to stand for 360 minutes in a separable flask in which the temperature was controlled to 30° C. in the presence of acetone vapor. The liquid content after the standing was 29% by mass. The resulting product was dried at 80° C. for two hours and then ground using a pin mill type grinder (trade name: Fine Impact Mill, manufactured by Hosokawa Micron Corporation) to produce granular crosslinked carboxyl group-containing polymer particles. The thus-obtained granular crosslinked carboxyl group-containing polymer particles were classified using a sieve with a mesh size of 1000 μm, whereby 11.5 g of the granular crosslinked carboxyl group-containing polymer particles having an adjusted particle size were obtained.

For the thus-obtained granular crosslinked carboxyl group-containing polymer particles, the median particle size, bulk density and time required for swelling were measured. The results obtained are shown in Table 1.

Comparative Example 4

Crosslinked carboxyl group-containing polymer particles (15 kg) obtained in the same manner as in Example 1 were granulated by compression molding granulation. The compression molding apparatus used was Pharma Impactor (model: CS-25, manufactured by Hosokawa Micron Corporation). The particles were compression-molded between two rolls (roll diameter: 230 mm, roll distance: 1.2 mm, number of roll revolutions: 5 rpm, compression molding pressure: 0.15 T/cm$^2$). The subsequent grinding using Fine Impact Mill (trade name, manufactured by Hosokawa Micron Corporation) and classification gave 13.6 kg of the compression-molded granular crosslinked carboxyl group-containing polymer particles.

For the thus-obtained compression-molded granular crosslinked carboxyl group-containing polymer particles, the median particle size, bulk density and time required for swelling were measured. The results obtained are shown in Table 2.

Reference Example 1

For crosslinked carboxyl-group containing polymer particles in the form of a fine white powder as obtained in the same manner as in Example 1, the bulk density and time required for swelling were measured and the median particle size was measured using a laser diffraction type particle size distribution measuring apparatus (model: SALD-2000J, manufactured by Shimadzu Corporation, disperse media: normalhexane). The results obtained are shown in Table 1.

TABLE 2

|  | Method of granulation | Median particle size [μm] | Bulk density [g/ml] | Time required for swelling [minute] |
| --- | --- | --- | --- | --- |
| Example 1 | Method of the present invention | 500 | 0.49 | 13 |
| Comparative Example 4 | Compression molding | 550 | 0.41 | 120 or longer |

The results shown in Table 1 and Table 2 indicate that the granular crosslinked carboxyl group-containing polymer particles as obtained by the production method of the present invention have a high bulk density and also swell in water in a short period of time.

Example 6

A 500 ml four-necked flask equipped with a stirrer, a thermometer, a nitrogen inlet tube and a condenser was charged with 45 g (42.9 ml) of acrylic acid, 0.68 g of Blemmer VMA70 (produced by NOF Corporation, a mixture of 10 to 20 parts by mass of stearyl methacrylate, 10 to 20 parts by mass of eicosanyl methacrylate, 59 to 80 parts by mass of behenyl methacrylate and at most 1 part by mass of tetracosanyl methacrylate) as the (meth)acrylic acid alkyl ester containing an alkyl group of 10 to 30 carbon atoms, 0.153 g of α,α'-azobisisobutyronitrile and 150 g (223.9 ml) of normal-hexane, followed by uniform stirring for mixing up. Thereafter, nitrogen gas was blown into the solution for removing the oxygen present in the upper space of a reaction vessel, raw materials and a solvent. Subsequently, while the temperature was maintained at 60 to 65° C., the reaction was allowed to proceed under nitrogen atmosphere for four hours.

After completion of the reaction, the slurry formed was heated to 90° C. to distill off the normalhexane, and the residue was further dried at 110° C. under reduced pressure (10 mm Hg) for eight hours, whereupon 42 g of the alkyl-modified carboxyl group-containing polymer particle was obtained as a fine white powder.

The thus-obtained alkyl-modified carboxyl group-containing polymer particles (12 g) were thinly and uniformly spread on a stainless steel dish with a diameter of 10 cm, and then allowed to stand for 10 minutes in a separable flask in which the temperature was controlled to 55° C. in the presence of methanol vapor. The liquid content after the standing was 8% by mass. The resulting product was dried at 80° C. for two hours and then ground using a pin mill type grinder (trade

TABLE 1

|  | Temperature [° C.] | Polar solvent | Time standing in polar solvent vapor [minute] | Liquid content after standing [% by mass] | Median particle size [μm] | Bulk density [g/ml] | Time required for swelling [minute] |
| --- | --- | --- | --- | --- | --- | --- | --- |
| Example 1 | 54 | Methanol | 10 | 8 | 500 | 0.49 | 13 |
| Example 2 | 70 | Ethanol | 30 | 11 | 530 | 0.50 | 14 |
| Example 3 | 55 | Acetone | 30 | 13 | 530 | 0.52 | 13 |
| Example 4 | 66 | Ethyl methyl ketone | 50 | 20 | 550 | 0.54 | 16 |
| Example 5 | 75 | Ethyl acetate | 50 | 21 | 510 | 0.50 | 13 |
| Comparative Example 1 | 30 | Methanol | 30 | 3 | <106 | 0.15 | 120 or longer |
| Comparative Example 2 | 30 | Ethanol | 30 | 4 | <106 | 0.15 | 120 or longer |
| Comparative Example 3 | 30 | Acetone | 360 | 29 | 610 | 0.57 | 90 |
| Reference Example 1 | — | — | — | — | 5-10 | 0.12 | 120 or longer | name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.4 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The swelling time was evaluated by the method mentioned below. The results are shown in Table 3.

[Evaluation Method]

Water (150 g) is placed in a 200 ml beaker and the water temperature is adjusted to 25° C. While this is in a standing-still state, 0.75 g of the granular alkyl-modified carboxyl group-containing polymer particles are fed into the water, and the time to be required for all the polymer particles to swell to the core thereof is measured. The judgment about the time of arrival of the granular alkyl-modified carboxyl group-containing polymer particles at the state of swelling in water is made by observing with eyes whether or not the polymer particles, which are white when being dried, become translucent white as a result of swelling in water.

Example 7

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 30 minutes in a separable flask in which the temperature was controlled to 70° C. in the presence of ethanol vapor. The liquid content after the standing was 12% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.5 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Example 8

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 30 minutes in a separable flask in which the temperature was controlled to 55° C. in the presence of acetone vapor. The liquid content after the standing was 12% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.5 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Example 9

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 50 minutes in a separable flask in which the temperature was controlled to 67° C. in the presence of ethyl methyl ketone vapor. The liquid content after the standing was 19% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.6 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Example 10

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 50 minutes in a separable flask in which the temperature was controlled to 76° C. in the presence of ethyl acetate vapor. The liquid content after the standing was 20% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.4 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Comparative Example 5

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 30 minutes in a separable flask in which the temperature was controlled to 30° C. in the presence of methanol vapor. The liquid content after the standing was 3% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.5 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Comparative Example 6

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 30 minutes in a separable flask in which the temperature was controlled to 30° C. in the presence of ethanol vapor. The liquid content after the standing was 4% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.5 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Comparative Example 7

Alkyl-modified carboxyl group-containing polymer particles (12 g) as white fine powders obtained in the same manner as in Example 6 were thinly and uniformly spread on a stainless steel dish with a diameter of 10 cm, and then allowed to stand for 360 minutes in a separable flask in which the temperature was controlled to 30° C. in the presence of acetone vapor. The liquid content after the standing was 30% by mass. The resulting product was dried at 80° C. for two hours and then ground using a pin mill type grinder (trade name: Fine Impact Mill, manufactured by Hosokawa Micron Corporation) to produce granular alkyl-modified carboxyl group-containing polymer particles. The thus-obtained granular alkyl-modified carboxyl group-containing polymer particles were classified using a sieve with a mesh size of 1000 μm to remove coarse particles, whereby 11.4 g of the granular alkyl-modified carboxyl group-containing polymer particles having an adjusted particle size were obtained.

For the thus-obtained granular alkyl-modified carboxyl group-containing polymer particles, the median particle size, bulk density and time required for swelling were measured. The results are shown in Table 3.

Comparative Example 8

Alkyl-modified carboxyl group-containing polymer particles (15 kg) as white fine powders obtained in the same manner as in Example 6 were granulated by compression molding granulation. The compression molding apparatus used was Pharma Impactor (model: CS-25, manufactured by Hosokawa Micron Corporation). The particles were compression-molded between two rolls (roll diameter: 230 mm, roll distance: 1.2 mm, number of roll revolutions: 5 rpm, compression molding pressure: 0.15 T/cm$^2$). The subsequent grinding using Fine Impact Mill (trade name, manufactured by Hosokawa Micron Corporation) and classification gave 13.3 kg of the compression-molded granular alkyl-modified carboxyl group-containing polymer particle.

For the thus-obtained compression-molded granular alkyl-modified carboxyl group-containing polymer particles, the median particle size, bulk density and time required for swelling were measured. The results are shown in Table 4.

Reference Example 2

For alkyl-modified carboxyl-group containing polymer particles in the form of a fine white powder as obtained in the same manner as in Example 6, the bulk density and time required for swelling were measured and the median particle size was measured using a laser diffraction type particle size distribution measuring apparatus (model: SALD-2000J, manufactured by Shimadzu Corporation, disperse media: normalhexane). The results are shown in Table 3.

TABLE 3

|  | Temperature [° C.] | Polar solvent | Time standing in polar solvent vapor [minute] | Liquid content after standing [% by mass] | Median particle size [μm] | Bulk density [g/ml] | Time required for swelling [minute] |
| --- | --- | --- | --- | --- | --- | --- | --- |
| Example 6 | 55 | Methanol | 10 | 8 | 490 | 0.50 | 15 |
| Example 7 | 70 | Ethanol | 30 | 12 | 510 | 0.50 | 16 |
| Example 8 | 55 | Acetone | 30 | 12 | 520 | 0.51 | 15 |
| Example 9 | 67 | Ethyl methyl ketone | 50 | 19 | 540 | 0.53 | 18 |
| Example 10 | 76 | Ethyl acetate | 50 | 20 | 510 | 0.50 | 15 |
| Comparative Example 5 | 30 | Methanol | 30 | 3 | <106 | 0.15 | 120 or longer |
| Comparative Example 6 | 30 | Ethanol | 30 | 4 | <106 | 0.15 | 120 or longer |
| Comparative Example 7 | 30 | Acetone | 360 | 30 | 600 | 0.57 | 100 |
| Reference Example 2 | — | — | — | — | 5-10 | 0.12 | 120 or longer |

TABLE 4

|  | Method of granulation | Median particle size [μm] | Bulk density [g/ml] | Time required for swelling [minute] |
|---|---|---|---|---|
| Example 6 | Method of the present invention | 490 | 0.50 | 15 |
| Comparative Example 8 | Compression molding | 560 | 0.39 | 120 or longer |

The results shown in Table 3 and Table 4 indicate that the granular alkyl-modified carboxyl group-containing polymer particles as obtained by the production method of the present invention have a high bulk density and also swell in water in a short period of time.

INDUSTRIAL APPLICABILITY

The production method of the present invention makes it possible to produce granular carboxyl group-containing polymer particles which hardly form undissolved lumps, have an excellent swelling property in water, hardly cause dusting and are thus superior in handleability as compared with carboxyl group-containing polymer particles in fine powder form. By dissolving the granular carboxyl group-containing polymer particles obtained by the production method of the present invention in water and then neutralizing the solution with an alkali such as sodium hydroxide and triethanolamine, it is possible to obtain a neutralized viscous liquid excellent in surface smoothness, thickening property and transparency in a short period of time.

The invention claimed is:

1. A method for producing granular carboxyl group-containing polymer particles, comprising:
   producing carboxyl group-containing polymer particles;
   preparing an aggregate of the carboxyl group-containing polymer particles by allowing the carboxyl group-containing polymer particles to absorb a polar organic solvent so as to have a liquid content of 5 to 25% by mass; and
   drying the aggregate of the carboxyl group-containing polymer particles and then grinding the dried aggregate,
   wherein, in preparing the aggregate of the carboxyl group-containing polymer particles, the polar organic solvent is at least one solvent selected from the group consisting of alcohols containing 1 to 5 carbon atoms, ketones containing 3 to 6 carbon atoms, esters containing 3 to 6 carbon atoms, and ethers containing 4 to 6 carbon atoms.

2. The method for producing granular carboxyl group-containing polymer particles according to claim 1,
   wherein, in producing the carboxyl group-containing polymer particles, an α,β-unsaturated carboxylic acid compound and a compound containing two or more ethylenically unsaturated groups are polymerized in an inert solvent in the presence of a radical polymerization initiator so as to produce crosslinked carboxyl group-containing polymer particles.

3. The method for producing granular carboxyl group-containing polymer particles according to claim 1,
   wherein, in producing the carboxyl group-containing polymer particles, an α,β-unsaturated carboxylic acid compound and a (meth)acrylic acid alkyl ester containing an alkyl group of 10 to 30 carbon atoms are polymerized in an inert solvent in the presence of a radical polymerization initiator so as to produce alkyl-modified carboxyl group-containing polymer particles.

4. Granular carboxyl group-containing polymer particles produced by the production method according to claim 1, wherein the granular carboxyl group-containing polymer particles have following characteristics 1) to 3):
   1) a median particle size of 300 to 800 μm;
   2) a bulk density of not lower than 0.30 g/ml; and
   3) swelling time in water of no longer than 30 minutes for all the granular carboxyl group-containing polymer particles to swell when placed in standing water at 25° C. in a proportion of 0.5% by mass relative to the water.

* * * * *